United States Patent
Chauvel

(10) Patent No.: US 7,266,824 B2
(45) Date of Patent: *Sep. 4, 2007

(54) ADDRESS SPACE PRIORITY ARBITRATION

(75) Inventor: Gerard Chauvel, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 538 days.

This patent is subject to a terminal disclaimer.

(21) Appl. No.: 09/932,556

(22) Filed: Aug. 17, 2001

(65) Prior Publication Data

US 2002/0065867 A1    May 30, 2002

(30) Foreign Application Priority Data

| Aug. 21, 2000 | (EP) | ................................. 00402331 |
| Mar. 29, 2001 | (EP) | ................................. 01400818 |
| May 3, 2001 | (EP) | ................................. 01401152 |

(51) Int. Cl.
*G06F 3/00* (2006.01)
(52) U.S. Cl. .................................................. 719/310
(58) Field of Classification Search ................ 719/310; 711/151; 710/200
See application file for complete search history.

(56) References Cited

U.S. PATENT DOCUMENTS

| 4,449,183 A * | 5/1984 | Flahive et al. ............... 711/151 |
| 4,814,974 A * | 3/1989 | Narayanan et al. ......... 710/244 |
| 4,818,932 A * | 4/1989 | Odenheimer ............ 324/121 R |
| 5,333,319 A | 7/1994 | Silen et al. |
| 5,581,722 A * | 12/1996 | Welland ..................... 711/207 |
| 5,588,134 A | 12/1996 | Oneto et al. |
| 5,590,353 A * | 12/1996 | Sakakibara et al. ............ 712/4 |
| 5,740,437 A | 4/1998 | Greenspan et al. |
| 5,906,000 A * | 5/1999 | Abe et al. .................... 711/151 |
| 5,918,160 A * | 6/1999 | Lysejko et al. ............... 455/74 |
| 6,006,303 A * | 12/1999 | Barnaby et al. ............ 710/244 |
| 6,321,309 B1 * | 11/2001 | Bell et al. .................... 711/150 |

FOREIGN PATENT DOCUMENTS

EP    0 327 852 A    8/1989

OTHER PUBLICATIONS

David Eck, xLogicCircuits Lab 2: Memory Circuits, 1997.*

* cited by examiner

*Primary Examiner*—William Thomson
*Assistant Examiner*—LeChi Truong
(74) *Attorney, Agent, or Firm*—Robert D. Marshall, Jr.; W. James Brady; Frederick J. Telecky, Jr.

(57) ABSTRACT

A digital system and method of operation is provided in which several processors (400[]) are connected to a shared resource (432). Each processor has a translation lookaside buffer (TLB) (310[]) that contains recently used page entries that each includes an access priority value. Access priority values are assigned to regions of address space, typically pages, according to the program or data that is stored on a given page. Access priority values are maintained in page tables with address translations, such that when a translated page address is loaded into a TLB, the access priority associated with that page is included in the TLB page entry. Arbitration circuitry (430) is connected to receive a request signal from each processor along with an access priority value (353[]) from each TLB in response to the requested address. The arbitration circuitry is operable to schedule access to the shared resource according to the access priority values provided by the TLBs.

12 Claims, 8 Drawing Sheets

ADDRESS SPACE PRIORITY ARBITRATION

This application claims priority to European Application Serial No. 00402331.3, filed Aug. 21, 2000 (TI-31366EU), European Application Serial No. 01400818.9.3, filed Mar. 29, 2001, 2000 (TI-31347EU) and to European Application Serial No. 01401152.2, filed May 3, 2001 (TI-32850EU). U.S. Patent Application Ser. No. 09/932,651 (TI-31366US) is incorporated herein by reference.

FIELD OF THE INVENTION

This invention generally relates to microprocessors, and more specifically to improvements in access to shared resources, systems, and methods of making.

BACKGROUND

Microprocessors are general purpose processors which provide high instruction throughputs in order to execute software running thereon, and can have a wide range of processing requirements depending on the particular software applications involved.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever increasing DSP performance while keeping power consumption as low as possible.

To further improve performance of a digital system, two or more processors can be interconnected. For example, a DSP may be interconnected with a general purpose processor in a digital system. The DSP performs numeric intensive signal processing algorithms while the general purpose processor manages overall control flow. The two processors communicate and transfer data for signal processing via shared memory. A direct memory access (DMA) controller is often associated with a processor in order to take over the burden of transferring blocks of data from one memory or peripheral resource to another and to thereby improve the performance of the processor.

Modular programming builds a computer program by combining independently executable units of computer code (known as modules), and by tying modules together with additional computer code. Features and functionality that may not be provided by a single module may be added to a computer program by using additional modules.

The design of a computer programming unit known as a task (or function) is often accomplished through modular programming, where a specific task is comprised of one module and the additional computer code needed to complete the task (if any additional code is needed). However, a task may be defined as broadly as a grouping of modules and additional computer codes, or, as narrowly as a single assembly-type stepwise command.

A computer program may be processed (also called "run" or "executed") in a variety of manners. One manner is to process the computer code sequentially, as the computer code appears on a written page or on a computer screen, one command at a time. An alternative manner of processing computer code is called task processing. In task processing, a computer may process computer code one task at a time, or may process multiple tasks simultaneously. In any event, when processing tasks, it is generally beneficial to process tasks in some optimal order.

Unfortunately, different tasks take different amounts of time to process. In addition, the result, output, or end point of one task may be required before a second task may begin (or complete) processing.

Furthermore, particularly in a multiple processor environment, several tasks may need access to a common resource that has a generally fixed capacity.

Accordingly, there is needed a system and method for managing task processing that takes into account task processing times, resource capabilities and capacity, and other task processing needs.

SUMMARY OF THE INVENTION

Particular and preferred aspects of the invention are set out in the accompanying independent and dependent claims. In accordance with a first embodiment of the invention, there is provided a digital system having several processors and a shared resource that is accessed by the processors. Each processor is connected to a translation lookaside buffer (TLB) of a memory management unit, each TLB has storage circuitry for storing a plurality of page entries and each page entry has an access priority field. Each TLB is operable to output an access priority value in response to a received address. Arbitration circuitry is connected to receive a request signal from each of the devices and an access priority value from each TLB. The arbitration circuitry is operable to schedule access to the shared resource according to the access priority values.

In another embodiment, a method is provided for prioritizing access to a shared resource in a digital system having several devices vying for access to the shared resource. The address space of the shared resource is organized into address space regions, such as pages. An individual access priority value is assigned to an address space region. When a device initiates an access request to the shared resource, the access request specifies a target address within the address space of the shared resource. An access priority value is provided with the access request that corresponds to an access priority value assigned to an address space region selected by the target address. Access to the shared device is scheduled by arbitration using the access priority values.

In an embodiment of the invention, a program task occupies several address space regions, a first access priority value is assigned to one of the address space regions and a different access priority value is assigned to another one of the address space regions.

In an embodiment of the invention, several program tasks occupy a same address space region and a single access priority value is assigned to the address region.

In an embodiment of the invention, access priority values are assigned by starting a program task and determining an access priority value specified by the program task. An address space region is allocated for the program task and the access priority value specified by the program task is assigned to the address space region allocated for the program task.

In one embodiment of the invention, the access priority value assigned to an address space region is the same as the execution priority of a task to which the memory address region is allocated. In another embodiment, the execution priority of a task and the access priority specified by the task can be different values.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 1 and in which.

Corresponding numerals and symbols in the different figures and tables refer to corresponding parts unless otherwise indicated.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
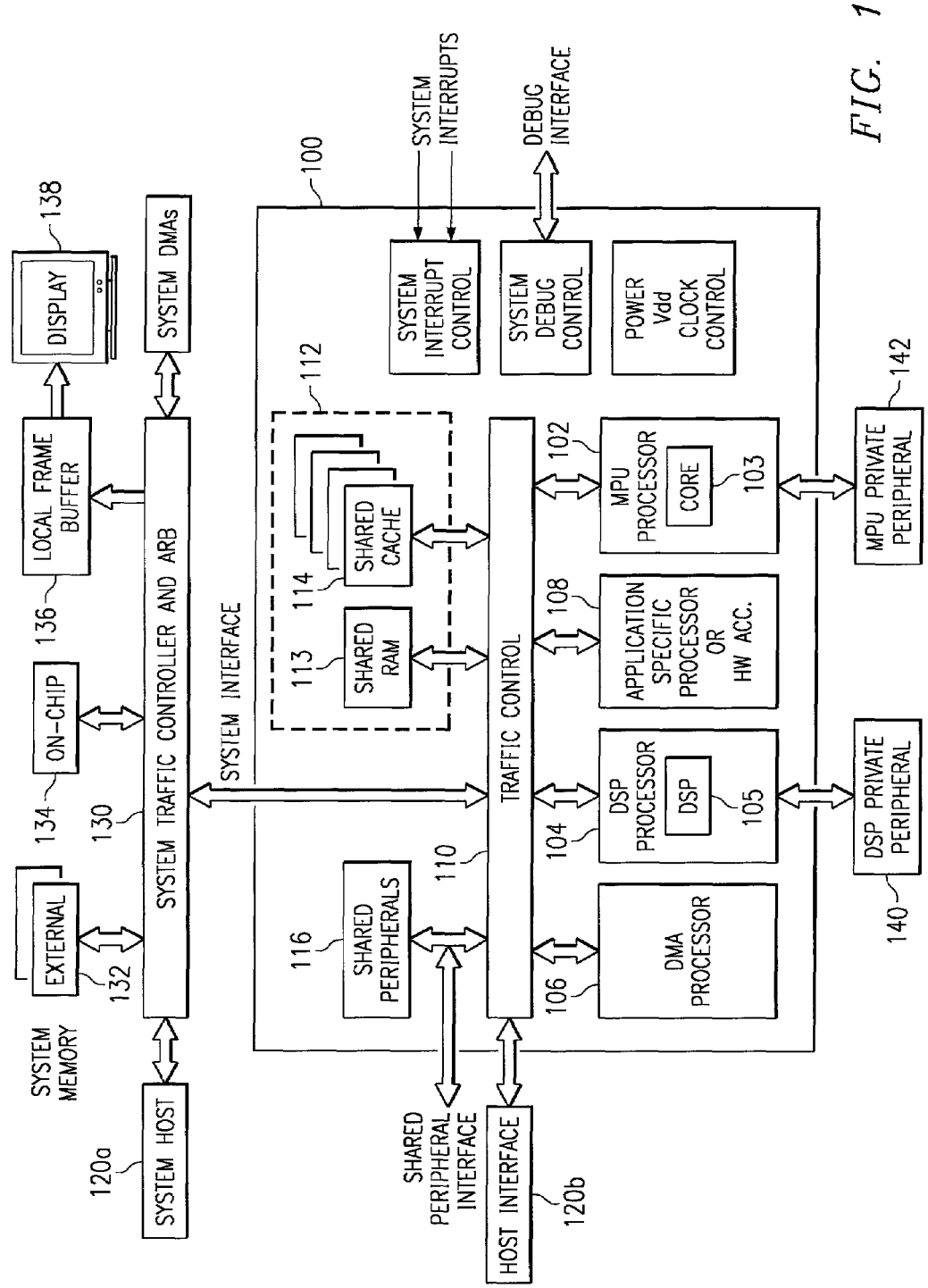
FIG. 1 is a block diagram of a digital system that includes an embodiment of the present invention in a megacell core having multiple processor cores.

FIG. 1 is a block diagram of a digital system that includes an embodiment of the present invention in a megacell core 100 having multiple processor cores. In the interest of clarity, FIG. 1 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Referring again to FIG. 1, megacell 100 includes a control processor (MPU) 102 with a 32-bit core 103 and a digital signal processor (DSP) 104 with a DSP core 105 that share a block of memory 113 and a cache 114, that are referred to as a level two (L2) memory subsystem 112. A traffic control block 110 receives transfer requests from a host processor connected to host interface 120b, requests from control processor 102, and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

External to the megacell, a level three (L3) control block 130 is connected to receive memory requests from internal traffic control block 110 in response to explicit requests from the DSP or MPU, or from misses in shared cache 114. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. A host processor 120a interacts with the external resources through system traffic controller 130. A host interface connected to traffic controller 130 allows access by host 120a to external memories and other devices connected to traffic controller 130. Thus, a host processor can be connected at level three or at level two in various embodiments. A set of private peripherals 140 are connected to the DSP, while another set of private peripherals 142 are connected to the MPU.

Figure 2A:
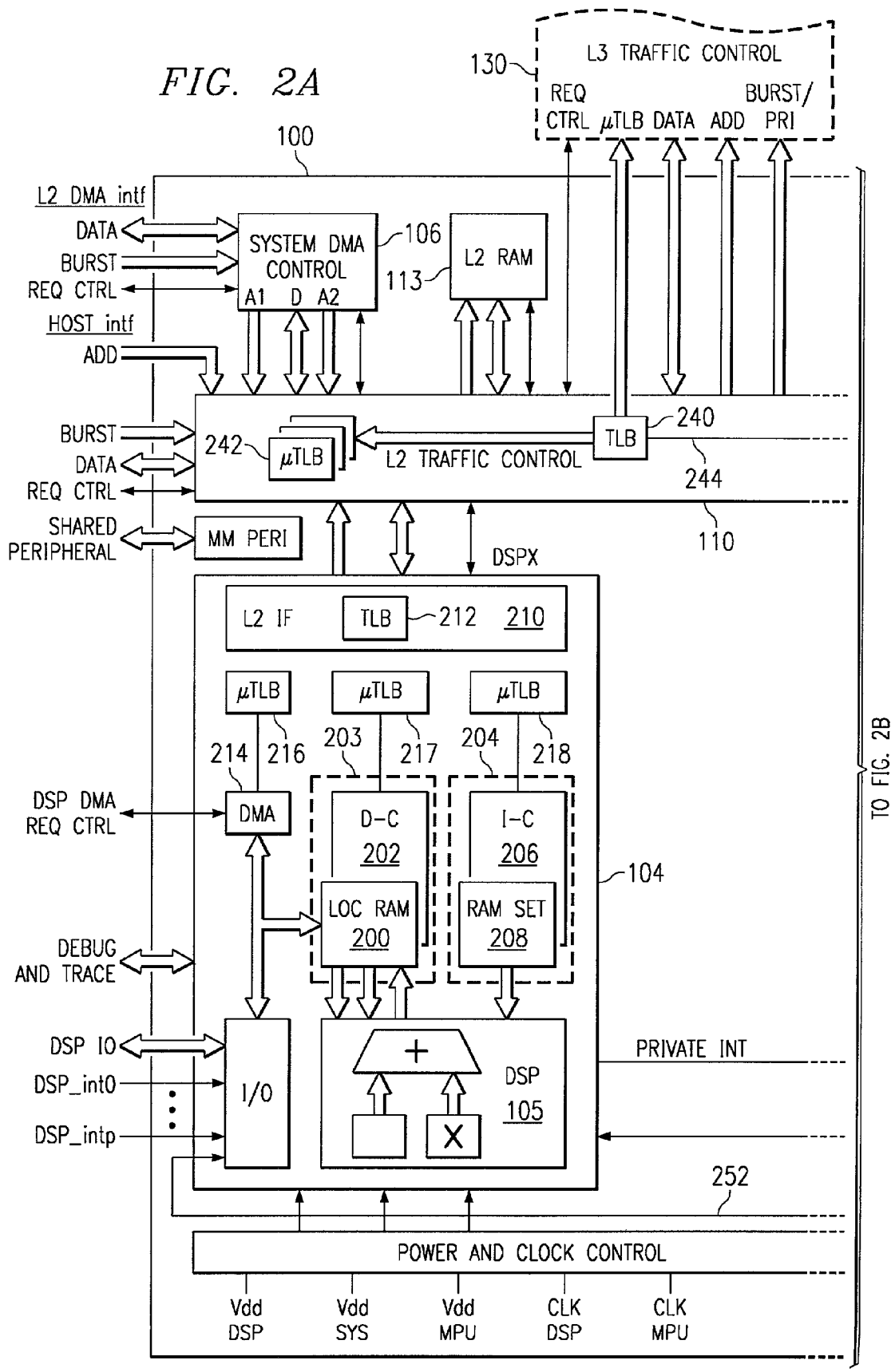
FIGS. 2A and 2B together is a more detailed block diagram of the megacell core of FIG. 1.
Figure 2B:
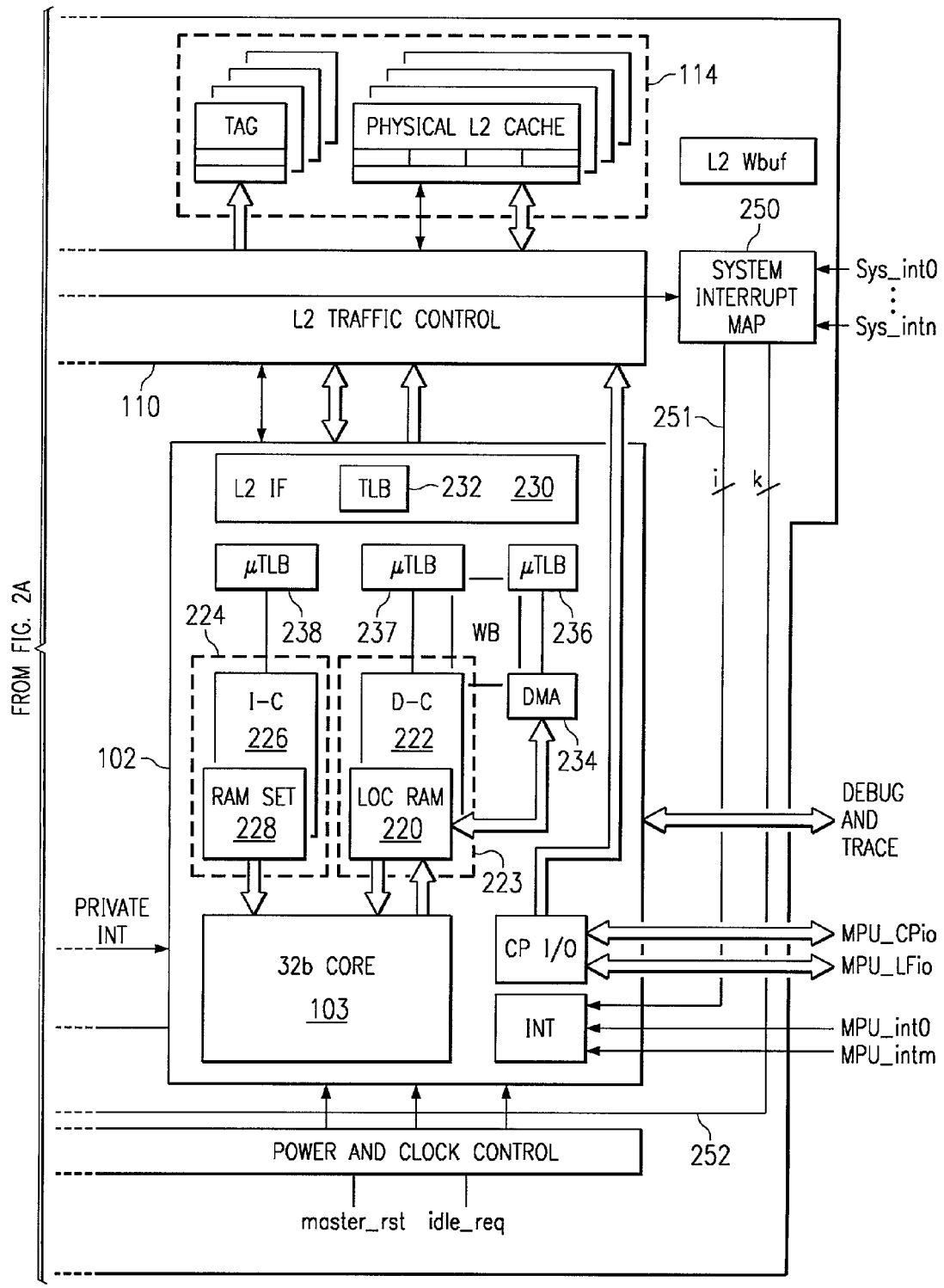

FIG. 2, comprised of FIG. 2A FIG. 2B together, is a more detailed block diagram of the megacell core of FIG. 1. DSP 104 includes a configurable cache 203 that is configured as a local memory 200 and data cache 202, and a configurable cache 204 that is configured as instruction cache 206 and a RAM-set 208, which are referred to as level one (L1) memory subsystems. The DSP is connected to the traffic controller via an L2 interface 210 that also includes a translation look-aside buffer (TLB) 212. A DMA circuit 214 is also included within the DSP. Individual micro TLBs (μTLB) 216-218 are associated with the DMA circuit, data cache and instruction cache, respectively.

Similarly, MPU 102 includes a configurable cache 223 that is configured as a local memory 220 and data cache 222, and a configurable cache 224 that is configured as instruction cache 226 and a RAM-set 228, again referred to as L1 memory subsystems. The MPU is connected to traffic controller 110 via an L2 interface 230 that also includes a TLB 232. A DMA circuit 234 is also included within the MPU. Individual micro TLBs (μTLB) 236-238 are associated with the DMA circuit, data cache and instruction cache, respectively.

L2 traffic controller 110 includes a TLB 240 and one or more micro-TLB (μTLB) 242 that are associated with system DMA block 106, host processor interface 120b for a host connected at level two, and other application specific hardware accelerator blocks. Similarly, L3 traffic controller 130 includes a μTLB controllably connected to TLB 240 that is associated with system host 120a at level three. This μTLB is likewise controlled by one of the megacell 100 processors.

Memory Management Unit

At the megacell traffic controller level, all addresses are physical. They have been translated from virtual to physical at the processor sub-system level by a memory management unit (MMU) associated with each core, such as DSP core 105 and MPU core 103. At the processor level, access permission, supplied through MMU page descriptors, is also checked, while at the megacell level protection between processors is enforced by others means, which will be described in more detail later.

The translation lookaside buffer (TLB) caches contain entries for virtual-to-physical address translation and page descriptor information such as access permission checking, cache policy for various levels, etc. If the TLB contains a translated entry for the virtual address, the access control logic determines whether the access is permitted. If access is permitted, the MMU generates the appropriate physical address corresponding to the virtual address. If access is not permitted, the MMU sends an abort signal via signal group 244 to the master CPU 102. The master CPU is identified by the value of the R-ID field. On a slave processor such as a hardware accelerator the R-ID is equal to the R-ID of the master CPU.

Upon a TLB miss, i.e., the TLB does not contain an entry corresponding to the virtual address requested, an exception is generated that initiates a translation table walk software routine. The TLB miss software handler retrieves the translation and access permission information from a translation table in physical memory. Once retrieved, the page or section descriptor is stored into the TLB at a selected victim location. Victim location selection is done by software or with hardware support.

Translation Table

To provide maximum flexibility, the MMU is implemented as a software table walk, backed up by TLB caches both at the processor sub-system and megacell level. This allows easy addition of new page size support or new page descriptor information if required. A TLB miss initiates a TLB handler routine to load the missing reference into the TLB. At the Megacell 100 level, a TLB miss asserts a miss signal in signal group 244 and is routed via system interrupt router 250 to the processor having generated the missing reference or to the processor in charge of the global memory management, via interrupt signals 251, 252.

Translation tables and TLB cache contents must be kept consistent. A flush operation is provided for this reason.

An address reference is generally located within the µTLB or main TLB of each processor sub-system; however, certain references, such as those used by system DMA 106 or host processor 120, for example, to access megacell memories can be distributed within L2 traffic controller 110 and cached into L2 system shared TLB 240 Because system performance is very sensitive to the TLB architecture and size, it is important to implement efficient TLB control commands to lock entries for critical tasks or unlock and flush those entries when a task is deleted without degrading the execution of other tasks. Therefore, each TLB and L2 cache entry holds a task-ID. Commands are supplied to flush locked or unlocked entries of a TLB/µTLB corresponding to a selected task.

As part of the page descriptor information, the MMU provides cacheability and bufferability attributes for all levels of memory. The MMU also provides a "Shared" bit for each entry to indicate that a page is shared among multiple processors (or tasks). This bit, as standalone or combined with the task-ID, allows specific cache and TLB operation on data shared between processors or/and tasks. The MMU may also provides additional information, such as access permission (AP) and memory access priority (MA_Priority) as described later.

All megacell memory accesses are protected by a TLB. As they all have different requirements in term of access frequencies and memory size, a shared TLB with individual µTLB backup approach has been chosen to reduce the system cost at the megacell level. This shared TLB is programmable by each processor. The architecture provides enough flexibility to let the platform work with either independent operating systems (OS) on each processors or a distributed OS with a unified memory management, for example.

The present embodiment has a distributed operating system (OS) with several domains corresponding to each processor but only a single table manager for all processors. Slave processors do not manage the tables. In a first embodiment, slave processor R-IDs are equal to the R-ID of the master CPU. In another embodiment, they could, however, have a different R-ID to control their TLB entries lock/unlock entries corresponding to some of their own tasks or flush all their entries, when putting themselves in sleep mode to free entries for the others processors. Having different R-ID provides a means to increase security in a concurrent multi-processor environment, processor X can not access memory allocated to processor Y.

In another embodiment with several independent OS(s), for example, there will be independent tables. These tables can be located in a memory space only viewed by the OS that they are associated with in order to provide protection from inadvertent modification by another OS. As they manage the virtual memory and task independently, the R-ID provides the necessary inter-processor security. R-Ids are managed by a single master CPU. This CPU can make TLB operations on all TLB entries. TLB operation or memory accesses from slave processor are restricted by their own R-ID. The CPU master will have rights to flush out entries belonging to another processor in a different OS domain.

The organization of the data structures supporting the memory management descriptor is flexible since each TLB miss is resolved by a software TLB-miss handler. These data structures include the virtual-to-physical address translation and all additional descriptors to manage the memory hierarchy. The list of these descriptors and their function is described in Table 2. Table 1 includes a set of memory access permission attributes, as an example. In other embodiments, a processor may have other modes that enable access to memory without permission checks.

TABLE 1

| Memory Access Permission | |
|---|---|
| Supervisor | User |
| No access | No access |
| Read only | No access |
| Read only | Read only |
| Read/Write | No access |
| Read/Write | Read only |
| Read/Write | Read/Write |

TABLE 2

Memory Management Descriptors

| | |
|---|---|
| Execute Never | provides access permission to protect data memory area from being executed. This information can be combined with the access permission described above or kept separate. |
| Shared | indicates that this page may be shared by multiple tasks across multiple processor. |
| Cacheability | Various memory entities such as individual processor's cache and write buffer, and shared cache and write buffer are managed through the MMU descriptor. The options included in the present embodiment are as follows: Inner cacheable, Outer cacheable, Inner Write through/write back, Outer write through/write back, and Outer write allocate. The terms Inner and outer refer to levels of caches that are be built in the system. The boundary between inner and outer is defined in specific embodiment, but inner will always include L1 cache. In a system with 3 levels of caches, the inner correspond to L1 and L2 cache and the outer correspond to L3 due to existing processor systems. In the present embodiment, inner is L1 and outer is L2 cache. |
| Endianism | determines on a page basis the endianness of the transfer. |
| Priority | Indicates a priority level for the associated memory address region. Memory access can be prioritized based on this priority value. |

MMU/TLB Control Operation

Figure 3:
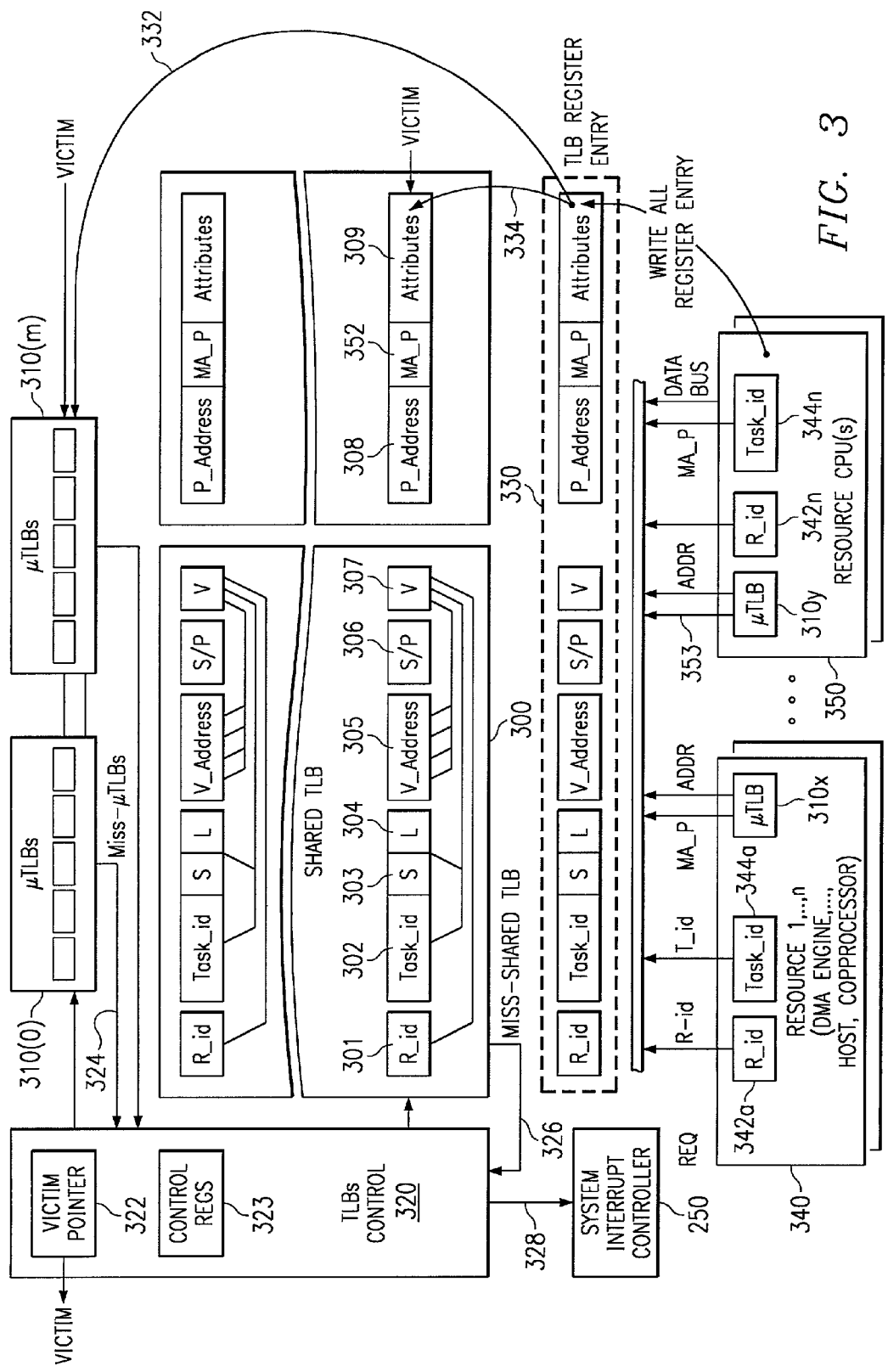
FIG. 3 is a block diagram illustrating a shared translation lookaside buffer (TLB) and several associated micro-TLBs (μTLB) included in the megacell of FIG. 2, having an access priority field in each entry.

FIG. 3 is a block diagram illustrating a shared translation look-aside buffer (TLB) 300 and several associated micro-TLBs (µTLB) 310(0)-310(n) included in megacell 100 of FIG. 2. On a µTLB miss, the shared TLB is first searched. TLB controller 320 is alerted by asserting a µTLB miss signal 324. In case of a hit on the shared TLB, the µTLB that missed is loaded with the entry content of the shared TLB 300. In case of miss in shared TLB 300, the shared TLB alerts TLB controller 320 by asserting a TLB miss signal 326. Controller 320 then asserts an interrupt request signal 328 to system interrupt controller 250. Interrupt controller 250 asserts an interrupt to the processor whose OS supervises the resource which caused the miss. A TLB entry register 330 associated with TLB controller 320 is loaded by a software TLB handler in response to the interrupt. Once loaded, the contents of TLB entry register 330 are transferred to both shared TLB 300 and the requesting µTLB at a selected victim location as indicated by arcs 332 and 334.

A separate TLB entry register 330 is only one possible implementation and is not necessarily required. The separate register TLB entry register is a memory mapped register that allows buffering of a complete TLB entry (more than 32 bits). A TLB value is not written directly in the TLB cache but is written to the TLB entry register first. Because of the size of an entry, several writes are required to load the TLB entry register. Loading of a TLB cache entry is then done in a single operation "Write TLB entry". Advantageously, other µTLBs associated with other modules can continue to access the shared TLB while the TLB entry register is being loaded, until a second miss occurs. Advantageously, by controlling access to the TLB via the TLB entry register, CPUs have no direct access to TLB cache internal structure and thus the risk of partial modifications inconsistent with the MMU tables is avoided.

The sequence of operations to update a TLB cache entry after a miss is:

1—the software TLB handler writes to the TLB entry register,

2—the software TLB handler sends a command to write the TLB entry, which transfers a value from TLB entry register to a preselected victim TLB cache entry; and 3—control circuitry checks and pre-selects a next victim TLB entry, in preparation for the next miss. In this embodiment, this step is generally performed in background prior to the occurrence of a miss.

Advantageously, TLB cache entries can be preemptively updated under OS software control to prevent TLB miss by pre-loading a new entry, using the following sequence of operation:

1—control circuitry checks and selects a TLB entry, referred to as a victim TLB cache entry.

2—the software TLB handler writes to the TLB entry register, and

3—the software TLB handler sends a command to write the TLB entry, which transfers a value from TLB entry register to the selected victim TLB cache entry.

The priority on the shared TLB is managed in the same way as priority on a memory access. One or more resources can be using the shared TLB. One or more resources can program the shared TLB. The replacement algorithm for selecting the next victim location in the shared TLB is under hardware control. A victim pointer register 322 is maintained for each TLB and µTLB to provide a victim separate pointer for each. A typical embodiment will use a round robin scheme. Another embodiment may use a least recently used scheme or a random scheme, for example. Different TLBs within a single megacell can use different replacement schemes. However, in an embodiment in which the system has a master CPU with a distributed OS, this master CPU could also bypass the hardware replacement algorithm by selecting a victim entry, reading and then writing directly to the Shared TLB.

In this embodiment, each shared TLB has 256 entries. Each µTLB is generally much smaller, i.e., has fewer entries, than the shared TLB. In various embodiments, each shared TLB has 64-256 or more entries while µTLBs generally have 4-16 entries. The penalty for a miss in a µTLB is small since a correct entry is generally available from the shared TLB. Therefore, the present embodiment does not provide direct control of the victim pointers of the various µTLBs; however, direct control of the victim pointer of shared TLBs, such as 212, 232, and 240, is provided.

Each entry in a TLB has a resource identifier 301 along with task-ID 302. Resource-IDs and task IDs are not extension fields of the virtual address (VA) but simply address qualifiers. Resource IDs are provided by a resource-ID register associated with each requester resource; such as R-ID register 342a associated with resource 340 and R-ID register 342n associated with resource 350. Resource 340 is representative of various DMA engines, coprocessor, etc within megacell 100 and/or an external host connected to megacell 100. Resource 350 is representative of various processors within megacell 100. Each resource 340, 350 typically has its own associated R-ID register; however, various embodiments may choose to provide resource ID registers for only a selected portion of the resources. A task ID is provided by a task-ID register, such as task-ID register 344a associated with resource 340 and task-ID register 344n associated with resource 350. A task register associated with a non-processor resource, such as DMA, a coprocessor, etc, is loaded with a task value to indicate the task that it is supporting.

In another embodiment, only processor resources 340, 350 that execute program modules have an associated programmable task-ID register. In this case, a system wide default value may be provided for access requests initiated by non-processor resources such as DMA. The default value may be provided by a programmable register or hardwired bus keepers, for example.

Advantageously, with the task-ID, all entries in a TLB belonging to a specific task can be identified. They can, for instance, be invalidated altogether through a single operation without affecting the other tasks. Advantageously, the resource ID permits discrimination of different tasks being executed on different resources when they have the same task number. Task-ID number on the different processors might not be related; therefore, task related operations must be, in some cases, qualified by a resource-ID.

In another embodiment, the R-ID and Task_ID registers are not necessarily part of the resource core and can be located elsewhere in the system, such as a memory mapped register for example, and associated to a resource bus. The only constraint is that a task_ID register related to a CPU must be under the associated OS control and updated during context switch. R-ID must be set during the system initialization. In some embodiments at system initialization, all R-ID and Task-ID registers distributed across the system are set to zero, which is a default value that causes the field to be ignored. In other embodiments, a different default value may be used. In other embodiments, R-ID "registers" provide hardwired values.

In yet another embodiment, the R-ID and/or task-ID registers are not implemented. In this case, the TLB does not contain R-ID and/or task-ID fields in the page entries and the attendant advantages are not realized. However, aspects of the present invention can still be implemented in such an embodiment.

Referring still to FIG. 3, each TLB entry includes a virtual address field 305 and a corresponding physical address field 308 and address attributes 309. Various address attributes are described in Table 1 and Table 2. Address attributes define conditions or states that apply to an entire section or page of the address space that is represented by a given TLB entry. An S/P field 306 specifies a page size. In the present embodiment, an encoding allows page sizes of 64 kb, 4 kb and 1 kb to be specified. Naturally, the page size determines how many most significant (ms) address bits are included in a check for an entry.

Each TLB entry also includes "shared" bit 303 and a lock bit 304. All entries marked as shared can be flushed in one cycle globally. A V field 307 indicates if an associated TLB cache entry is valid. V field 307 includes several V-bits that are respectively associated with R-ID field 301 to indicate if a valid R-ID entry is present, task-ID field 302 to indicate if a valid task-ID entry is present, and virtual address field 305 to indicate if a valid address entry is present. These valid bits enable the compare logic with their associated field.

As mentioned earlier, the resource ID field and task ID field in each entry of the TLB/μTLB can be used to improve security. During program task execution, each transaction request is checked by the miss control circuitry of the TLB/μTLB to determine if the entry is allowed for a specific resource or for all resources and for a specific task or for all tasks. For example, if a request is received and a valid entry is present for the proffered virtual address but a task ID or R-ID which accompany the request does not match the corresponding valid task ID and R-ID fields of the entry, then a miss is declared. If the task ID and/or R-ID fields of the entry are marked as invalid, then they are ignored.

Still referring to FIG. 3, a memory access priority (MA_P) field 352 is included in each TLB entry. During each memory system access request, an access priority value corresponding to the address page being accessed is provided on an output of the TLB. For example, when processor 350 initiates a request, a translated target address is output from μTLB 310y along with a corresponding address space priority value on signals 353. Access priority is thus related directly to the address being accessed, referred to as the target address. Access priority is therefore also referred to herein as address space priority.

In general, the access priority of an address page is set according to the execution priority of the task that is associated with that page. However, various embodiments may make provisions to specify both an execution priority and an access priority for a given task. In certain embodiments, a single task may specify different access priority values for different portions of the task.

When multiple requests to a shared resource are pending, arbitration circuitry associated with the shared resource allows the request with the highest access priority to be processed first. The use and operation of access priority field 352 will now be described in detail.

Figure 4:
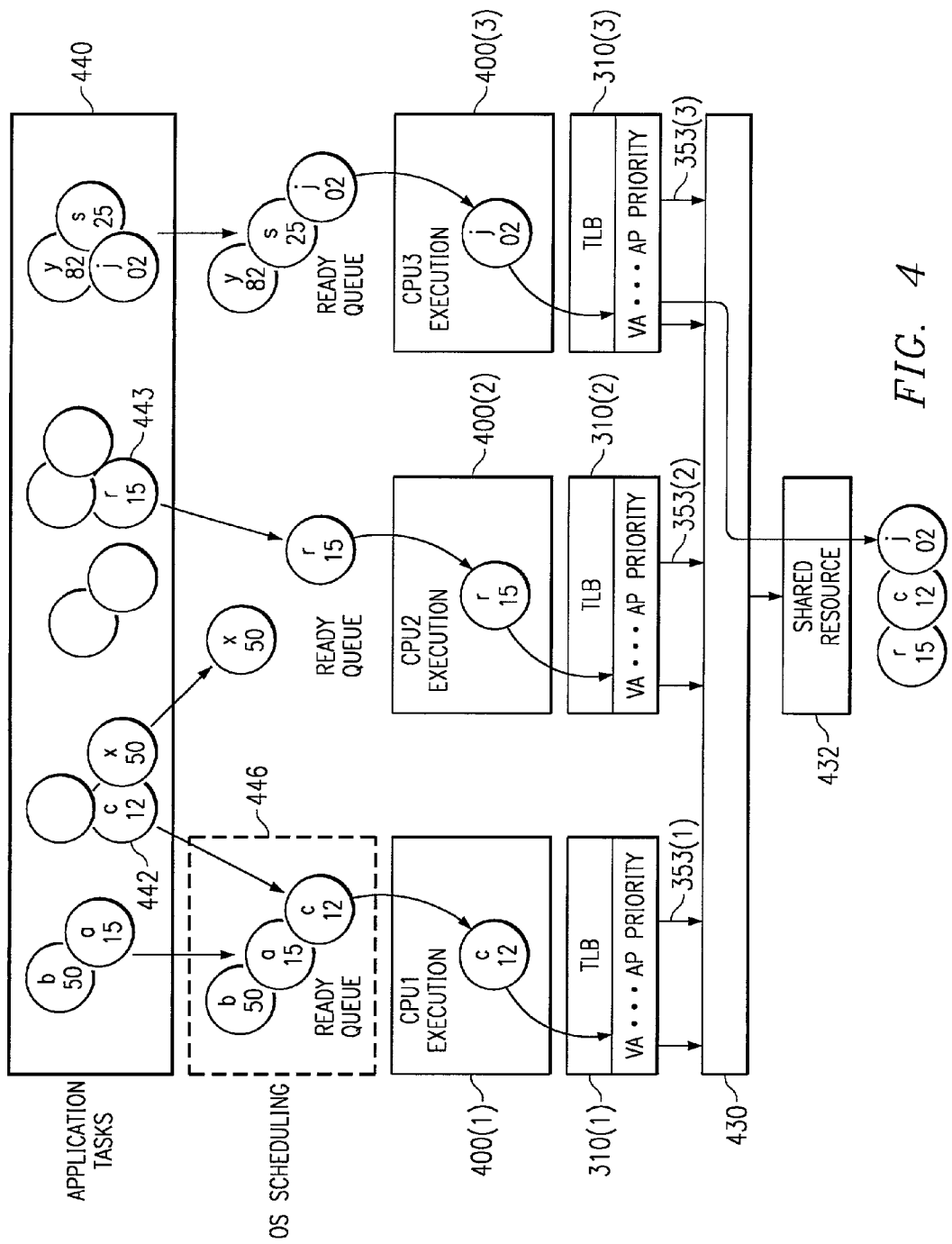
FIG. 4 is a block diagram of a digital system similar to FIG. 1 illustrating use of an access priority field in a μTLB associated with each processor of a multiprocessor system for memory address access priority arbitration.

FIG. 4 is a block diagram of a digital system similar to that of FIG. 1 illustrating a μTLB 310[] in each processor 400[] of a multiprocessor system. Each μTLB provides an access priority value on signals 353[] with each access request for address space priority arbitration. Arbitration circuitry within traffic management circuitry 430 arbitrates pending requests for shared resource 432 and allows access to the request having the highest address space priority first. Shared resource 432 can be the L2 cache, for example, or other memory or interface devices, for example.

In this illustration, a circle such as 442 represents a task, with a task name "c" and a task priority of 12, for example. Likewise, task 443 has a task name "r" and a priority of 15, where a lower number indicates a higher priority. If the set of tasks 440 are assigned to three processors, then an operating system on each processor forms a ready to execute queue, such as ready queue 446 in which task "c" is scheduled for first execution, then task "a" and finally task "b" according to priority values of 12, 15, and 50 respectively. In a prior system, access to shared resources 432 would be based on an access priority associated with the processor on which a task is executed. Unfortunately, this prior scheme may result in slow execution of a high priority task on a low priority processor.

Figure 5:
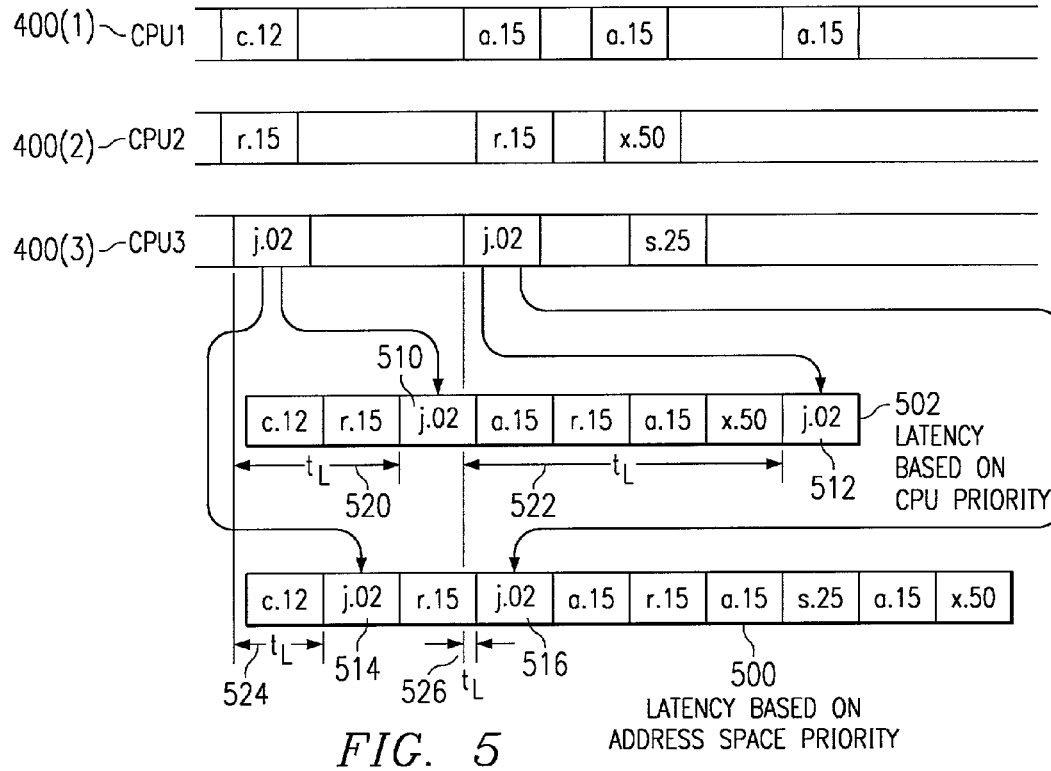
FIG. 5 is a timing diagram illustrating an example of latency using memory address based priority arbitration according to FIG. 4.

FIG. 5 is a timing diagram illustrating an example of latency using address space access priority arbitration according to FIG. 4, as opposed to latency using CPU priority for memory access priority. In this example, CPU1 has a fixed resource priority that is high. CPU1 is executing task c.12, then switches to task a.15. CPU2 is executing task r.15 then switches to low priority task x.50. CPU 3 has a low fixed priority and is executing high priority task j.02 and then switches to lower priority task s.25.

In latency timeline 502 using CPU priority, request c.12 and r.15 occur simultaneously; CPU1 has higher priority than CPU2 and request c.12 is scheduled for shared resource 1432 first. Request j.02 from CPU 3 and r.15 from CPU 2 next via for access. Since CPU2 has higher priority than CPU3, request r.15 is scheduled next and then followed by j.02 at time 510. Then, request a.15 and r.15, followed by request a.15 and x.50 are scheduled before request j.02 is scheduled at time 512.

In latency timeline 500, address space priority is used and it is assumed that the address space priority value is set to correspond to the execution priority of the task associated with that page address. As before, request c.12 and r.15 occur simultaneously; task c.12 has higher priority than r.15 and request c.12 is scheduled for shared resource 432 first. Request j.02 from CPU 3 and r.15 from CPU 2 next via for access. Since task j.02 has higher priority than task r.15, request j.02 is scheduled next at time 514 followed by request r.15. Then, requests a.15, r.15 and j.02 all occur at approximately the same time. Since task j.02 has the highest priority, request j.02 is next scheduled at time 516. Advantageously, latency time 524 for high priority task j.02 executed on low priority CPU3 using address space priority is less than latency time 520 using CPU priority. Similarly, latency time 526 is less than latency time 522.

Referring again to FIG. 4, three processors 400[1], 400[2], 400[3] are illustrated; however, the concept is applicable to only two processors or to four or more.

Address space access priority can be established in several ways. For example, Table 3 illustrates several portions of instruction code sequences in which a task is spawned. From line 1 to line 5, task "c" is active and spawns a new task, "audio" on line 5. The kernel is then invoked to instantiate the new task and create the associated TCB. An eight bit (numbers of bits can be more or less) task-ID field is memorized in the TCB at line 11. SetTaskAttributePriority at line 12 is a system call that initializes the address space access priority (MA_Priority) associated with a task, as defined in a task control block. The system call also sets the access priority field in the page tables for the memory pages allocated to this task. During the context switch (reschedule in line 14) before launching the "audio" task, the kernel loads task-ID register 344n with the task-ID value held in the TCB (Table 4) or in another table. At line 15, the new task is now active.

TABLE 3

Setting Address Space Access Priority at the Start of a Task

```
1   // (Task c code execution)
2   Instruction 1
3   ------
4   instruction n
5   Taskspawn("audio",200,0,5000,(FUNCPTR)audio,
    // (Task c code execution: instruction n+2)
6       //(Kernel code execution)
7       -----
8       TaskCreate( )
9           //(taskcreate code execution)
10          ------
11          SetTaskAttributeID(TID)
12          SetTaskAttributePriority(MA_Priority) /access priority/
13          ------
14      // Kernel reschedule code execution
15  //(Task Audio code execution)
16  Instruction 1
17  -------
```

Table 4 is an example task control block that is used to define a task. At line 4, an execution priority value is defined that is used by the operating system to schedule execution of the task. At line 9, an address space access priority value is defined that is used to set the access priority field in the page tables when the task is instantiated. In some embodiments, the execution priority and the access priority fields can be combined in a single field corresponding to the OS task execution priority.

In other embodiments, there may be provided several address space access priority values for different address pages that are associated with a single task. For example, a portion of a task that is allocated on a first memory page may be given high access priority while another portion of the task on a second memory page may be given low access priority, for example.

TABLE 4

Setting Address Space Access Priority Using a TCB

```
1   TCB (task control block)
2   Typedef struct TCB
3   {
4       UINT OS-priority
5
6   #if CPU_FAMILY == xx
7       EXC_INFO excinfo;
8       REG_SET regs;
9       UINT    MA_priority
10  #endif
11  }
```

In other embodiments, other means than a TCB may be provided for setting address space access priority. For example, a call can be made to a subroutine and access priority can be set by either the call or by an operation at the beginning of the subroutine.

In an alternative embodiment, access priority information is not maintained in MMU page tables but is inserted by the TLB miss handler at the time of a TLB fault by using the task_ID value of the transaction request that caused the TLB fault to access the TCB of that task. Other embodiments may use other means for setting the access priority field in the TLB entry, such as by storing this information in a separate access priority table that is indexed by task ID or by virtual or physical address page number, for example.

Figure 6:
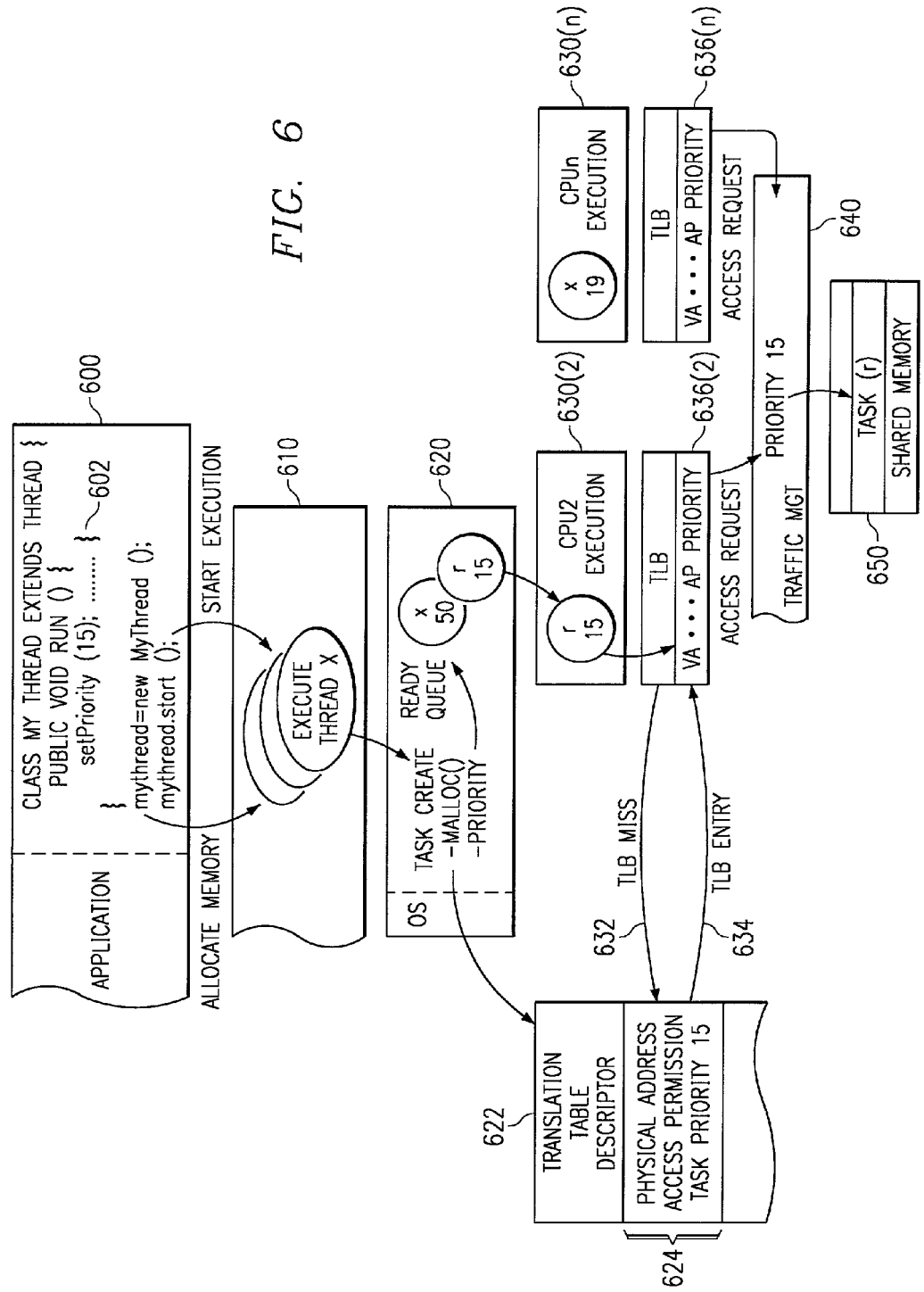
FIG. 6 is flow diagram illustrating execution of several different tasks using memory address access priority arbitration according to FIG. 4.

FIG. 6 is flow diagram illustrating execution of several different tasks in a digital system using memory address access priority arbitration according to FIG. 4. In step 600, a task is started and added to a cloud of tasks 610 waiting to be executed. Access priority is indicated by setPriority statement 602 and is included in a TCB block for the task. The task may be a JAVA applet, for example, and it may be acquired by accessing instruction memory associated with the digital system, or acquired via a wired or wireless network connection, for example.

In step 620, the OS selects tasks for execution based on execution priority and adds the selected tasks to the ready queue. As part of this selection process, memory is allocated for each task using a malloc( ) directive. The malloc( ) directive sets up one or more entries 624 in MMU page table structure 622 that defines the physical address of a page of virtual memory. According to an aspect of the present invention, access priority is also defined in the page table entries by a priority directive associated with the malloc( ) directive for each task. For example, for task r, an access priority of 15 is placed in the associated TCB in response to setPriority statement 202. This access priority value is then included in page table entries 622 for this task in MMU page table 624 during memory allocation.

In step 630[], various resources in the multiprocessor digital system execute tasks from the ready queues. CPU2 is executing task r, while CPUn is executing task x. s each CPU access memory during execution of a task, an associated TLB 636[] is accessed for memory address translation. If an entry corresponding to a given virtual address from CPU2 is not present, then a TLB miss 632 occurs and a TLB handler accesses page tables 622 to retrieve the proper entry 624, which includes the translated physical address value for the virtual address page and the address space access priority associated with that virtual address page. In a similar manner, TLB misses for CPUx are resolved.

In step 640, a traffic manager for shared resource 650 receives two simultaneous requests from CPU2 and CPUn. The request from CPU 2 has an access priority of 15, as defined by the TLB entry associated with virtual address page associated with task r. The request from CPUn has an access priority of 19, as defined by the TLB entry associated with task x. Since the request from CPU2 has the highest priority (lowest numeric value), CPU2 is given first access to shared resource 650.

Figure 7:
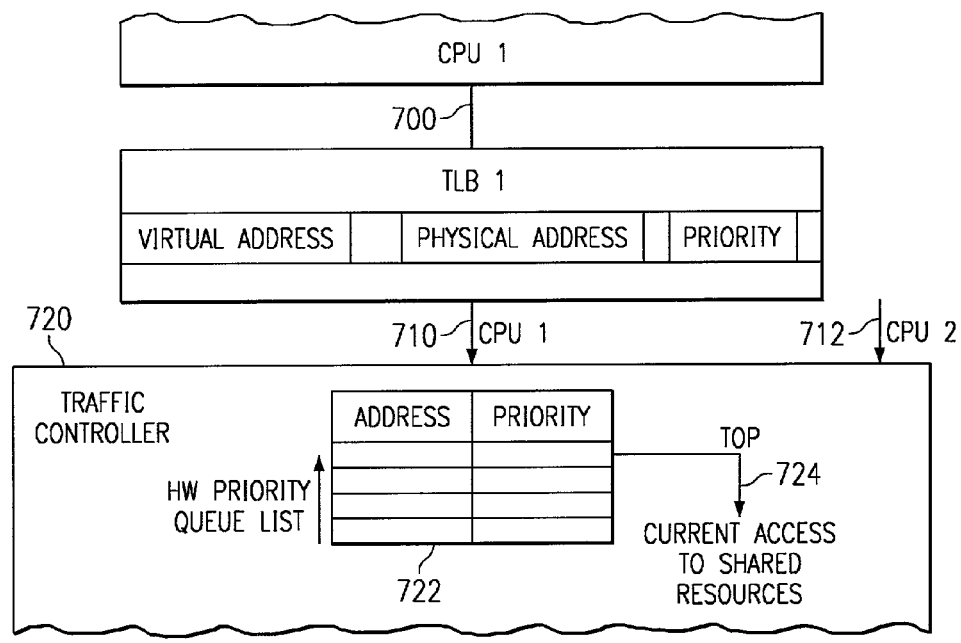
FIG. 7 is a block diagram of the digital system of FIG. 4 illustrating an arbitration circuit for memory address access priority arbitration.

FIG. 7 is a block diagram of the digital system of FIG. 4 illustrating an arbitration circuit for memory address access priority arbitration. CPU1 is connected to TLB1 and provides a virtual addresses on address bus 700 for each memory request. As discussed earlier, TLB1 receives the virtual address and outputs a physical address along with an associated access priority on request bus 710 to traffic control circuitry 720. In a similar manner, other requests are formed and received by traffic controller 720, such as from CPU2 on request bus 712. Traffic controller 720 includes arbitration and queuing circuitry 722 that ranks each pending request according to its associated access priority. The highest priority pending request is then forwarded to the shared resource via request bus 724.

As described above, the access priority provided by requests from CPU1 is provided by a field in the TLB entry and is therefore associated with the address range of a given memory request. However, in another embodiment, another requesting resource such as CPU2 could provide a priority value that is not related to a memory address. For example, CPU2's priority could be a fixed priority value that is determined by bus or resource hierarchy or other means.

Figure 8:
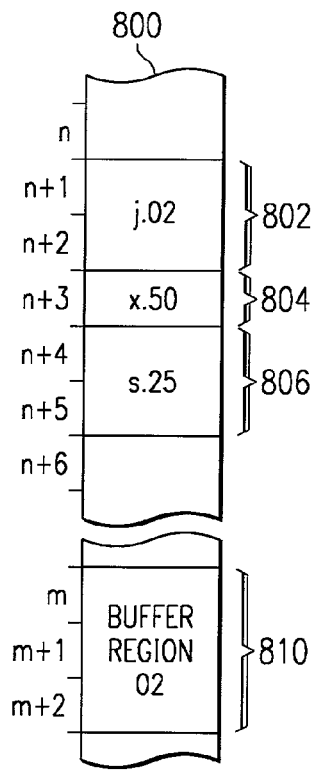
FIG. 8 is an illustration of a portion of the address space of the system of FIG. 4, illustrating address space priority values associated with various pages of the address space.

FIG. 8 is an illustration of a portion of the address space of the system of FIG. 4, illustrating address space priority values associated with various pages of the address space. Instructions for various tasks are stored in regions 802, 804, and 806, for example. In this case, pages in region 802 are assigned an address space access priority of 02, since that is the execution priority of task j.02. Likewise, region 804 is assigned an access priority of 50 and region 806 is assigned an access priority of 25. However, as discussed earlier, the access priority may be specified to have a different value than the execution priority of a task.

Buffer region 810 is used by all three tasks to pass data and is assigned an address space access priority of 02 since it is used by task j.02. Advantageously, when task x.50 is accessing buffer region 810 it will be accorded a priority value of 02 due to the address space priority in order to quickly provide data that may be needed by task j.02.

As discussed earlier, various pages associated with a same task may be accorded different address space access priority values. For example, page n+4 associated with task s.25 may be accorded an access priority of 25, while page n+5 may be accorded an access priority value that is much lower.

Similarly, when a single page holds more than one task, then the access priority of all of the tasks within the same page will be the same. Typically, the OS will select the highest access priority value specified by the various tasks assigned to a single page.

In another embodiment, a TLB may not be needed to provide the physical address. In that case, address signals are provided directly from the requesting device, for example. However, in such an embodiment, priority circuitry can be provided that responds to an address from a requesting device to provide a priority value responsive to a region of address space that is being requested. In this case, the priority circuitry can include a look up table that is indexed by the address signals provide directly by the requesting device, for example. In another embodiment, a truncated TLB is provided in which translated address fields are not included but in which address related attributes such as address space access priority are maintained.

Digital System Embodiment

Figure 9:
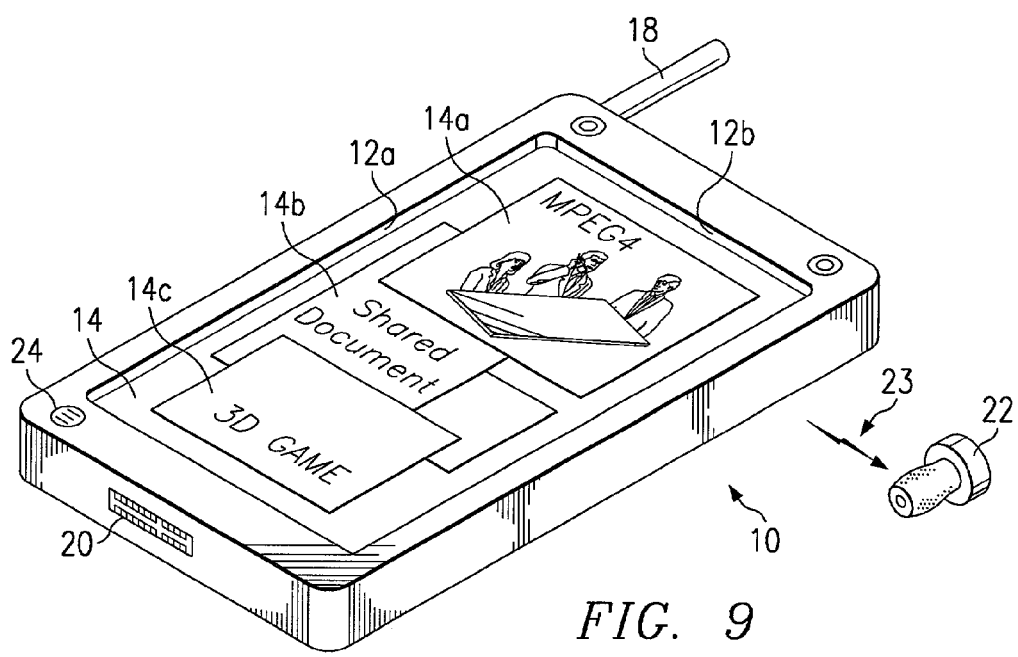
FIG. 9 is a representation of a telecommunications device incorporating an embodiment of the present invention.

FIG. 9 illustrates an exemplary implementation of an example of such an integrated circuit in a mobile telecommunications device, such as a mobile personal digital assistant (PDA) 10 with display 14 and integrated input sensors 12a, 12b located in the periphery of display 14. As shown in FIG. 9, digital system 10 includes a megacell 100 according to FIG. 1 that is connected to the input sensors 12a,b via an adapter (not shown), as an MPU private peripheral 142. A stylus or finger can be used to input information to the PDA via input sensors 12a,b. Display 14 is connected to megacell 100 via local frame buffer similar to frame buffer 136. Display 14 provides graphical and video output in overlapping windows, such as MPEG video window 14a, shared text document window 14b and three dimensional game window 14c, for example.

Radio frequency (RF) circuitry (not shown) is connected to an aerial 18 and is driven by megacell 100 as a DSP private peripheral 140 and provides a wireless network link. Connector 20 is connected to a cable adaptor-modem (not shown) and thence to megacell 100 as a DSP private peripheral 140 provides a wired network link for use during stationary usage in an office environment, for example. A short distance wireless link 23 is also "connected" to ear piece 22 and is driven by a low power transmitter (not shown) connected to megacell 100 as a DSP private peripheral 140. Microphone 24 is similarly connected to megacell 100 such that two-way audio information can be exchanged with other users on the wireless or wired network using microphone 24 and wireless ear piece 22.

Megacell 100 provides all encoding and decoding for audio and video/graphical information being sent and received via the wireless network link and/or the wire-based network link.

It is contemplated, of course, that many other types of communications systems and computer systems may also benefit from the present invention, particularly those relying on battery power. Examples of such other computer systems include portable computers, smart phones, web phones, and the like. As power dissipation and processing performance is also of concern in desktop and line-powered computer systems and micro-controller applications, particularly from a reliability standpoint, it is also contemplated that the present invention may also provide benefits to such line-powered systems.

Fabrication of the digital systems disclosed herein involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

The digital systems disclosed herein contain hardware extensions for advanced debugging features. These assist in the development of an application system. Since these capabilities are part of the megacell itself, they are available utilizing only a JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

As used herein, the term "higher priority" and "lower priority" refers to a logical value and not necessarily to a numeric value. For example, higher priority can be accorded to a lower numeric value.

A shared resource is typically a memory or a cache. However, other resources may be shared and make use of access scheduling using priority values as described herein; for example, memory mapped input/output (I/O) devices and ports, shared TLBs as described with respect to FIG. 3, graphical or video frame buffers, etc.

While the invention has been described with reference to illustrative embodiments, this description is not intended to be construed in a limiting sense. Various other embodiments of the invention will be apparent to persons skilled in the art upon reference to this description. For example, in another embodiment, one or more requesting devices which access a shared resource do not provide address space access priority values as described above. In this case, access for that requesting device is scheduled according to a fixed or positional priority, such as a resource, number using a fixed hierarchical scheme or a round robin scheme, for example. In such an embodiment, arbitration using address space access priority may be combined with positional priority with suitable weighting, or separate arbitration circuits may be overlaid to provide a final access schedule.

Address space access priority values may be specified based on task or data priority, as described earlier. Certain embodiments may specify access priority according to access time or response time of a resource. For example, if several different resources are on a common bus, higher access priority may be specified for the resource having the faster response time.

In one embodiment, each shared resource has arbitration circuitry associated with it, with a separate request bus from each requesting resource connected to several such arbitration circuits. In this case, some or all of the arbitration circuits perform access priority arbitration according to aspects of the present invention.

In another embodiment, a single arbitration circuit controls access to a shared bus connected to each of the requesting resources. In this case, the single arbitration circuit performs access priority arbitration according to aspects of the present invention.

It is therefore contemplated that the appended claims will cover any such modifications of the embodiments as fall within the true scope and spirit of the invention.

What is claimed is:

1. A method for prioritizing access to a shared resource in a digital system having a plurality of devices vying for access to the shared resource, comprising the steps of:
    organizing an address space of the shared resource into address space regions;
    assigning individual access priority values to a plurality of the address space regions, where at least some of the plurality of the address space regions include a plurality of addressable locations;
    initiating an access request by a first device of the plurality of devices, wherein the access request specifies a target address within the address space of the shared resource;
    providing an access priority value with the access request, such that the access priority value corresponds to the access priority value assigned to the address space region selected by the target address; and
    arbitrating the order of access between multiple pending requests to the shared resource for access to the shared resource based at least in part by using the access priority value assigned to each pending request.

2. The method of claim 1, wherein the shared resource is a memory circuit and wherein the step of assigning comprises assigning an access priority value to an address space region according to a program or data stored within the address space region.

3. The method according to claim 2, wherein a program task occupies several address space regions, and wherein the step of assigning assigns a first access priority value to a first one of the several address space regions and assigns a different access priority value to a second one of the several address space regions.

4. The method according to claim 2, wherein a plurality of program tasks occupy a single address space region, and wherein the step of assigning assigns a single access priority value to the single address space region.

5. The method according to claim 1, wherein the step of assigning comprises the steps of:
    starting a program task;
    determining an access priority value specified by the program task;
    allocating an address space region for the program task; and
    assigning the access priority value specified by the program task to the address space region allocated for the program task.

6. The method according to claim 1, wherein the step of providing comprises the steps of:
    storing at least a portion of the individual access priority values in page entries associated with a memory management unit (MMU); and
    accessing a selected page entry in the MMU in response to the target address specified by the access request to obtain an access priority value.

7. The method according to claim 1, wherein an access priority value assigned to an address space region is related to an execution priority value of a program task to which the address space region is allocated.

8. A digital system comprising:
a shared resource;
a plurality of devices connected to access the shared resource;
a plurality of memory management units (MMU) each connected to receive an address from a respective one of the plurality of devices, wherein each MMU has storage circuitry for storing a plurality of page entries and each page entry has an access priority value, each MMU being operable to output the access priority value associated with a received address; and
arbitration circuitry connected to receive a request signal from each of the plurality of devices and the associated access priority value from each MMU, wherein the arbitration circuitry is operable to schedule access to the shared resource according to the access priority values.

9. The digital system according to claim 8, wherein one or more of the plurality of MMUs comprise a translation lookaside buffer (TLB).

10. The digital system according to claim 8, wherein the shared resource is a memory circuit.

11. The digital system according to claim 8, wherein the shared resource is a bus, and further comprising a plurality of memory mapped resources connected to the bus.

12. The digital system according to claim 8 being a wireless communication device, wherein at least one of the plurality of devices is a processor (CPU), further comprising:
a display, connected to the CPU via a display adapter;
radio frequency (RF) circuitry connected to the CPU; and
an aerial connected to the RF circuitry.

* * * * *